E. J. WILLIS.
PLANIMETER.
APPLICATION FILED OCT. 2, 1920.
1,404,180. Patented Jan. 17, 1922.
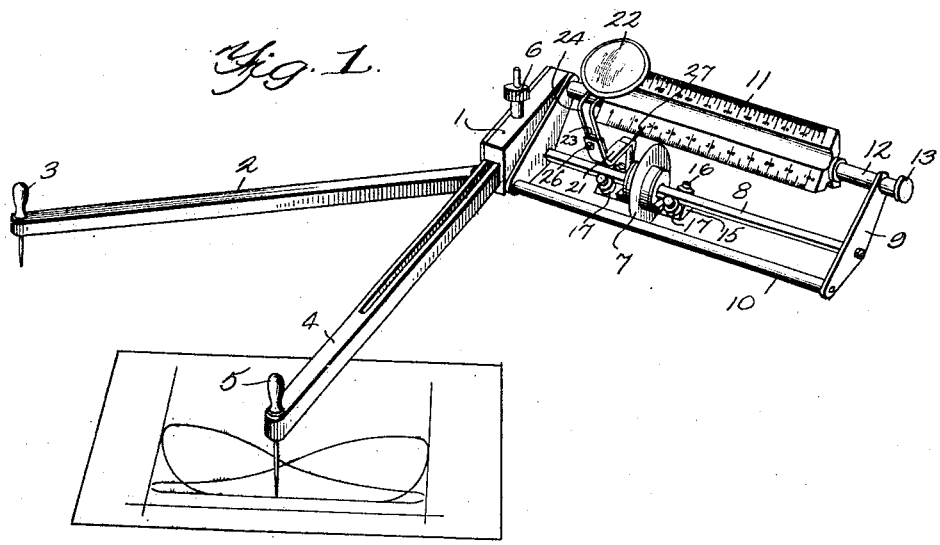
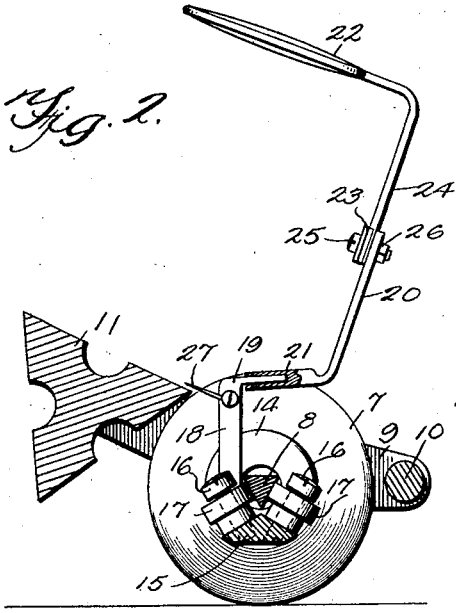
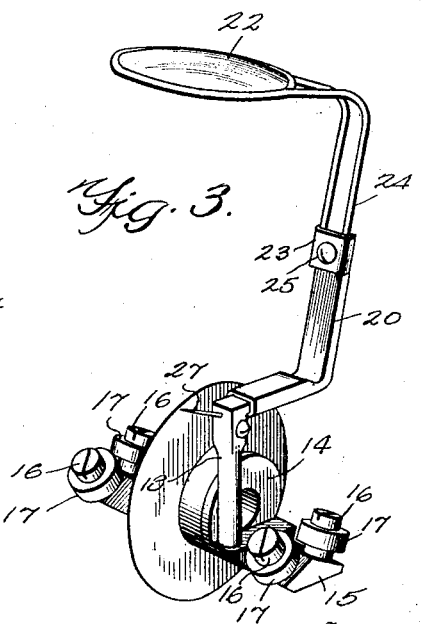
Inventor
Edward J. Willis
By Ch. Parker Attorney

UNITED STATES PATENT OFFICE.

EDWARD J. WILLIS, OF RICHMOND, VIRGINIA.

PLANIMETER.

1,404,180.　　　　　Specification of Letters Patent.　　Patented Jan. 17, 1922.

Application filed October 2, 1920. Serial No. 414,159.

*To all whom it may concern:*

Be it known that I, EDWARD J. WILLIS, a citizen of the United States, residing at Richmond, in the county of Henrico and State of Virginia, have invented certain new and useful Improvements in Planimeters, of which the following is a specification.

This invention relates to planimeters, and is an improvement over the construction shown and described in my prior Patent No. 672,581, dated April 23, 1901.

In my prior patent, I have disclosed and claimed a planimeter for ascertaining area and determining the mean effective pressure and horsepower of steam indicator diagrams, wherein a measuring wheel is employed whose axis is perpendicular to the tracer arm and wherein the wheel is capable of movement along its axis and a scale is arranged for measuring such movements.

In the present invention, I have produced means for supporting the measuring wheel on its spindle, whereby end play of the wheel is entirely eliminated and a very accurate construction is produced.

In the present construction, the hub of the measuring wheel is provided with an arm extending in each direction substantially parallel to the spindle or shaft on which the measuring wheel is supported. These arms are each provided with a pair of rollers arranged at an angle and having their peripheries disposed in planes parallel to the sides of the spindle which is preferably made triangular in shape. When the device is in use, the weight of the shaft and its associated parts is supported by the measuring wheel through these supporting wheels and the shaft is wedged in position between the two rollers preventing wear and play and producing an instrument which will retain its accuracy even after long use.

In the accompanying drawings, I have shown one embodiment of the invention. In this showing:

Figure 1 is a perspective view of the improved planimeter showing an indication card, Figure 2 is a transverse vertical sectional view through the supporting shaft of the measuring wheel, and, Figure 3 is a detail perspective view of the measuring wheel detached.

Referring to the drawings, the reference numeral 1 designates the frame of the construction to which is pivotally secured a fulcrum arm 2, provided at its outer end with a pin or point 3. A tracer arm 4 is provided at its outer end with a pin 5, and this arm is slidably supported in the frame. A set screw 6 is provided whereby the tracer arm may be secured in any desired position.

A measuring wheel 7 is arranged upon a shaft or spindle 8, the shaft being supported in suitable bearings in the frame 1 and in a bracket 9. A connecting rod 10 is secured to the frame and to the bracket to secure the bracket in position. A scale 11, such as is illustrated in my Patent No. 672,581, of April 23, 1901, is supported between the bracket and the frame by means of a spindle 12, secured to the scale and passing through openings in the frame and the bracket 9. A nut 13 is arranged on the end of the spindle to retain the scale in any desired position.

Referring to Figures 2 and 3 of the drawings, the shaft 8 is, as shown, triangular in cross-section. The measuring wheel is mounted to rotate on a sleeve 14, extending on each side of the wheel, and a pair of supporting members 15 project outwardly from these hubs. The sleeve is provided with a central opening for the passage of the triangular shaft. These supporting members are, as shown, substantially triangular in shape and are arranged with their upper faces substantially perpendicular to the lower faces or sides of the triangular shaft or spindle. A pair of stub shafts 16 are arranged on the upper faces of each of the members 15, and these shafts are adapted to receive rollers 17. The arrangement of the parts is such that the peripheries of the rollers are disposed in planes parallel to the planes of the lower faces or sides of the shaft 8, and the axes of the rollers are also preferably arranged parallel to the sides of the shaft. The shaft is supported by the rollers and the weight of the instrument thus transferred to the measuring wheel. It will be apparent that the weight of the frame and scale, transmitted through the shaft and the supporting rollers to the measuring wheel, always holds the shaft in engagement with the peripheries of the rollers 17, thereby eliminating all play and furnishing a perfect reading at all times, the measuring wheel responding to force exerted thereon by the movement of the tracer arm and properly indicating the result to be computed on the scale in the manner described in my prior patent.

Projecting from one of the supporting members 15 is a bracket 18, the upper end of which is arranged in a substantially horizontal plane, as at 19. An L-shaped member 20 is provided with a horizontal portion 21, having a socket for the reception of the horizontal arm 19, and this L-shaped member is adapted to support a lens or magnifying glass 22. The magnifying glass is secured to the L-shaped member by a clamp 23 adapted to receive the arms 24 of the magnifying glass and clamp them against the member 20. Any suitable means, such as a bolt 25 and a nut 26 may be employed in connection with this clamp. A pointer 27 is arranged on the bracket 18 and is adapted to be disposed near the scale to facilitate reading.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A planimeter, comprising a tracer arm, a measuring wheel having an axis perpendicular to said tracer arm, a shaft on which said wheel is supported, said shaft being provided with plane sides, a plurality of rollers carried by said wheel and engaging said shaft, said rollers being arranged with their peripheries parallel to the sides of the shaft, and a scale disposed adjacent said shaft and adapted to indicate the amount of movement of said wheel.

2. A planimeter, comprising a tracer arm, a measuring wheel having an axis perpendicular to said tracer arm, a triangular shaft on which said wheel is supported, a plurality of rollers carried by said wheel, said rollers being arranged in pairs and disposed at an angle whereby their axes and peripheries are arranged parallel to two sides of said shaft, and a scale disposed adjacent said shaft and adapted to indicate the amount of movement of said wheel.

3. A planimeter, comprising a tracer arm, a measuring wheel having an axis perpendicular to said tracer arm, a triangular shaft on which said wheel is supported, a supporting member projecting from each side of said wheel, a pair of rollers supported on each of said members, said rollers being disposed at an angle whereby their peripheries are arranged parallel to two sides of said shaft to receive and support said shaft, and a scale disposed adjacent said shaft.

4. A planimeter, comprising a tracer arm, a measuring wheel having an axis perpendicular to said tracer arm, a triangular shaft on which said wheel is supported, a substantially triangular supporting member projecting from each side of said wheel, rollers arranged on two faces of each of said supporting members with their axes and peripheries disposed in planes parallel to two sides of said shaft to receive and support said shaft, and a scale disposed adjacent said shaft.

In testimony whereof I affix my signature in presence of two witnesses.

EDWARD J. WILLIS.

Witnesses:
B. B. STRINGFELLOW,
W. BYRON TENNANT.